United States Patent [19]

Drews

[11] Patent Number: 4,563,121
[45] Date of Patent: Jan. 7, 1986

[54] CARGO ELEVATOR SYSTEM

[75] Inventor: Robert E. Drews, Winston Park, Ky.

[73] Assignee: Leyman Manufacturing Corp., Cincinnati, Ohio

[21] Appl. No.: 468,126

[22] Filed: Feb. 22, 1983

[51] Int. Cl.[4] .............................................. B60P 1/44
[52] U.S. Cl. .................................... 414/545; 187/9 R
[58] Field of Search .................. 414/540, 545, 557; 187/9 R; 298/23 R

[56] References Cited

U.S. PATENT DOCUMENTS

| | | | |
|---|---|---|---|
| 2,521,727 | 9/1950 | Kappen | 414/501 |
| 2,530,341 | 11/1950 | Satsky | 414/545 |
| 2,706,565 | 4/1955 | Krasno | 187/9 R |
| 2,792,079 | 5/1957 | Gibson | 187/9 R |
| 3,024,926 | 3/1962 | Nolden | 414/545 |
| 3,266,646 | 8/1966 | Byrne et al. | 414/545 |
| 3,371,805 | 3/1968 | Himes | 414/545 |
| 3,675,739 | 7/1972 | Erlinder | 414/545 X |
| 3,791,541 | 2/1974 | Himes | 414/545 |
| 3,800,915 | 4/1974 | Himes | 414/545 |
| 3,804,276 | 4/1974 | Himes | 414/786 |
| 3,831,788 | 8/1974 | Erlinder | 414/545 |
| 3,870,126 | 3/1975 | Himes | 414/545 X |
| 4,007,844 | 2/1977 | Perkins | 414/545 X |
| 4,056,203 | 11/1977 | Meldahl et al. | 414/540 |
| 4,063,619 | 12/1977 | Drews | 187/17 |
| 4,087,007 | 5/1978 | Drews | 414/545 |
| 4,113,121 | 9/1978 | Collins et al. | 414/545 |
| 4,198,188 | 4/1980 | Perkins | 414/545 |
| 4,219,103 | 8/1980 | Harsacky | 187/8.49 |

FOREIGN PATENT DOCUMENTS 774964 1/1968 Canada .
944319 3/1974 Canada .
1022502 12/1977 Canada .

Primary Examiner—Robert J. Spar
Assistant Examiner—Ken Muncy
Attorney, Agent, or Firm—Wood, Herron & Evans

[57] ABSTRACT

A cargo elevator system, that includes a pivotable cargo platform, particularly adapted for mounting on a truck. The system is operable through a unique open-/close sequence for translating the platform between a substantially vertical, upright storage position, and a horizontal elevator use position that permits the truck to be loaded and unloaded. The system is characterized by a unique latching mechanism for latching the platform in, and unlatching the platform from, the storage position. The system is also characterized by a first fail-safe structure for preventing the platform from swinging on its pivot axis toward ground level beyond its horizontal elevator use position. The system is further characterized by a second fail-safe structure that prevents the platform from moving out of its vertically upright position when so stored. The system is further characterized by a novel fastener mechanism for holding the platform's ramp in a cart stop position as the platform is raised and lowered during elevator use.

10 Claims, 8 Drawing Figures

CARGO ELEVATOR SYSTEM

This invention relates to cargo elevator systems. More particularly, this invention relates to a cargo elevator system in which the cargo platform can be used as an elevator, and in which the cargo platform is movable between elevator and storage positions. This type cargo elevator system is particularly useful when mounted on the cargo body of a truck.

Cargo platforms that are operable as elevators, and that are connected to and storable somewhere about a truck's cargo body so as to be movable with the truck, are well known in the prior art. This type cargo platform is mounted to the floor and/or sides of the truck's cargo body at the rear end, or along one side wall, thereof. This type cargo platform may function solely as an elevator, or it may also function as a complete or partial closure in the form of a door or a tailgate for the ingress/egress opening to the truck's cargo body. When so connected to a truck body, and in one embodiment well known to the prior art, the cargo platform is movable between (a) a storage or over-the-road position where the platform is vertically disposed relative to the cargo body's floor (where it may or may not at least partially close off the ingress/egress opening to the cargo body), and (b) a horizontal or elevator use position where the storage area of the cargo body is readily accessible for ingress and egress, and the cargo platform can be raised or lowered, i.e., can be used, as an elevator. When the cargo platform is to be used as an elevator, the cargo platform is first pivoted from its vertical storage position to its horizontal or cargo handling position. Once in the horizontal position, the platform may be moved up and down between the floor of the truck's cargo body, and ground level or a loading dock. Such elevator-like movement allows quick, efficient loading and unloading of the truck's cargo body by alternately raising and lowering the platform between a first loading level (e.g., the cargo body's floor level) for easy transferral of the cargo onto or off of the platform, and a second loading level (e.g., ground level) for easy transferral of the cargo off of or onto the platform. When the cargo platform is to be stored, it simply is pivoted back to its vertically upright storage position where it is raised substantially above ground level to permit over-the-road travel for the truck. Cargo elevator systems that function in this way, and that are of the type where the platform is stored in a vertically disposed position relative to the floor of a truck's cargo body for over-the-road use of the truck, are illustrated in the patents to W. H. Himes, U.S. Pat. No. 3,371,805, U.S. Pat. No. 3,791,541, U.S Pat. No. 3,804,276, U.S Pat. No. 3,800,915, and the patent to R. E. Drews, U.S. Pat. No. 4,087,007, all assigned to the assignee of this application.

With respect to each of the cargo platforms shown in the aforementioned patents, and indeed in connection with any and all platforms that are stored in a generally vertical position relative to ground, whether the platform is mounted to a truck's cargo body or otherwise, it is desirable that the platform be moved or translated from its horizontal elevator position to a vertical storage position when the platform is not being used as an elevator. There are two basic ways of achieving this objective. The first is to manually pivot the platform from the horizontal elevator use position into the vertical storage position. It will be understood this is not useful with heavy platforms, i.e., this approach is useful only with very small platforms or ramps. If the platform is a particularly large platform, e.g., a platform of a sufficient length to hold a loading cart, then it is no doubt likely such would be too heavy for manual movement between vertical storage and horizontal elevator use positions. Of course, there are known mechanisms by which a cargo platform can be translated between the vertical and horizontal positions. And one basic type of mechanism that has seen significant commercial success in the marketplace is that shown in various of the patents referred to above. This type mechanism is a sprocket and chain mechanism in which a chain connects the platform with a frame, the chain being compounded by the sprocket as the cargo platform's elevating mechanism is moved in elevator fashion. Use of this chain and compounding sprocket mechanism may be undesirable, however, in certain end use situations.

Accordingly, it has been one objective of this invention to provide an improved cargo elevator system that is characterized by a unique sequence of handling steps by which the cargo platform can be translated between a vertical storage position and a horizontal elevator position. Also in this regard, the novel cargo elevator system of this invention is characterized by a unique latching mechanism which is easily accessible to an operator after the cargo platform has been translated from its horizontal use position to its vertical storage position for release of the platform from that storage position, and which is automatically operated to latch the cargo platform in its vertical storage position when it is translated from the horizontal elevator position to its vertical storage position.

Also in connection with cargo platforms of the prior art type that are adapted for storage in the vertical position, and that are adapted for elevator use in the horizontal position, it is desirable to provide some sort of fail-safe structure by which the platform is retained vertically in its storage position, e.g., as a truck travels over the road when the platform is mounted to the truck's cargo body. And it also is desirable to provide some sort of fail-safe structure by which the platform is retained horizontally when the platform is used as an elevator.

Accordingly, it has been another objective of this invention to provide a cargo elevator system that includes a novel first fail-safe structure for a cargo platform of the type that pivots between vertical storage and horizontal elevator positions where that first fail-safe structure prevents the platform from pivoting on its swing axis toward ground substantially beyond its horizontal elevator position when it is located in the horizontal elevator position. Further, another objective of this invention has been to provide a cargo elevator system that includes a novel second fail-safe structure for a cargo platform of the type where the platform is adapted to be vertically stored which prevents the platform from pivoting out of its vertically upright position when in its vertical storage position so that the platform cannot break loose from that storage position if used, e.g., on a truck's cargo body as the truck travels over-the-road.

In connection with cargo elevator systems of the prior art as referred to above, it is often desirable to make use of wheeled carts on which cargo can be stacked so as to make loading and unloading of the trucks faster and easier than would normally be the case if same were loaded or unloaded by hand. Such carts may be in the nature of a flat bed supported on four wheels at the four corners of the bed, each end or side of the bed being provided with an upstanding frame to prevent the cargo stacked thereon from falling off. When these carts are used, and since the free edge of the elevator platform is in effect an unguarded edge, it is possible for the carts to roll off that free edge and tumble toward ground level unless watched closely as the elevator platform is being raised or lowered. There is known to the prior art a cart stop structure for a cargo elevator system of the type herein described that provides the capability of stopping wheeled carts from rolling off the platform's free edge. This prior art cart stop structure is shown in the patent to W. H. Himes, U.S. Pat. No. 3,870,126, assigned to the assignee of this application.

Accordingly, it has been a further objective of this invention to provide an improved cart stop for the cargo platform of a cargo elevator system in which the stop itself is comprised of a ramp for the main elevator section of the cargo platform, the ramp being located at the free edge of the platform's main section and pivotable between an inclined ramp position and a vertical stop position.

Other objectives and advantages of this invention will be more apparent from the following detailed description taken in conjunction with the drawings in which.

GENERAL ARRANGEMENT OF THE CARGO ELEVATING SYSTEM

Figure 1:
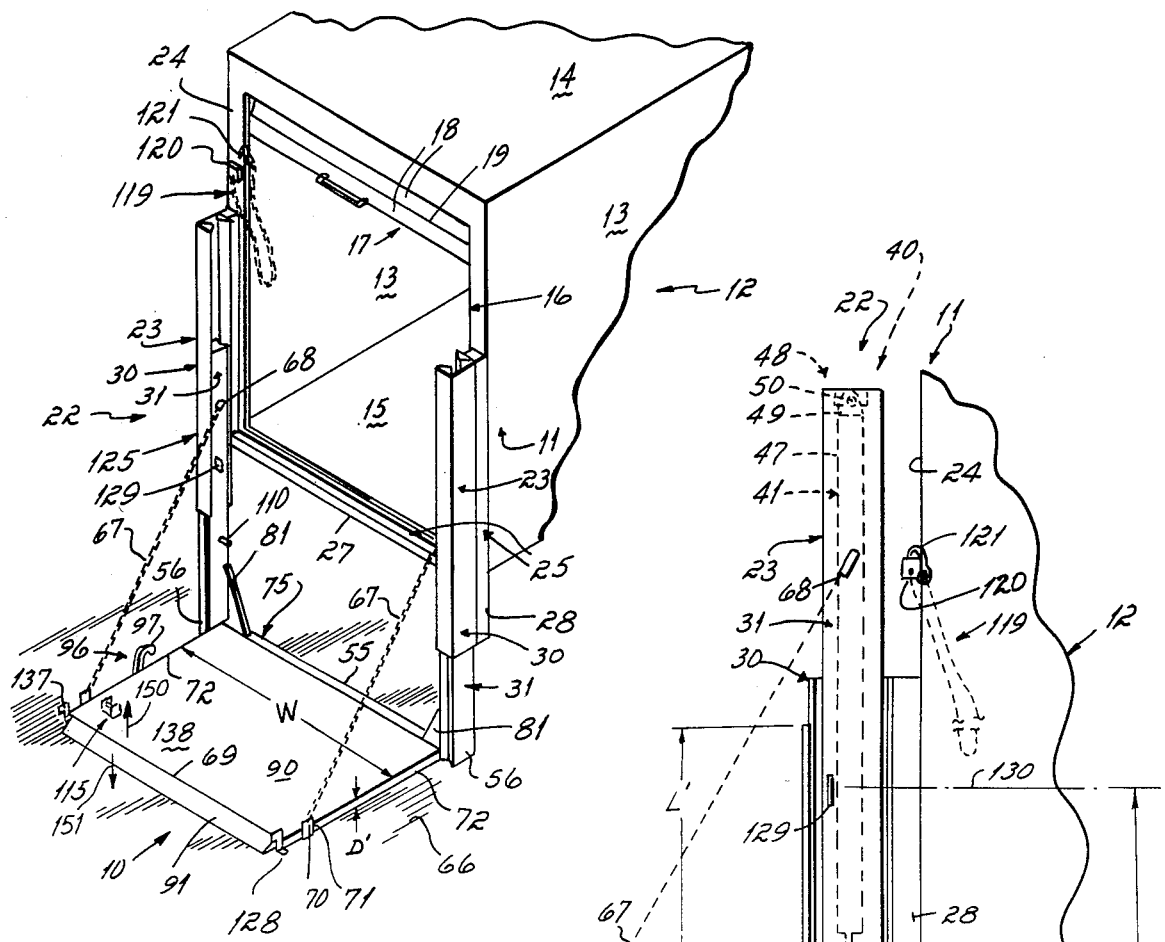
FIG. 1 is a perspective view of an improved cargo elevator system in accord with the principles of this invention, same being shown mounted on the rear end of a truck's cargo body, and being shown disposed at ground level.

A cargo platform 10 is connected to the rear end 11 of a truck's cargo body 12 having side walls 13, a roof 14 and a floor 15, see FIG. 1. The ingress/egress or access opening 16 in that cargo body 12 is opened and closed by a door 17 of the type that is storable adjacent the truck's roof 14. The door 17 is comprised of a series of articulated panels 18 hingedly connected together one to the other on hinge lines 19 parallel to ground 66, the panels being movably connected with the cargo body's roof 14 and with the side walls 13 at the access opening 16 by a roller and track structure, not shown.

The cargo platform 10 is pivotally connected on pivot axis 21 to an elevating mechanism 22 fixed to and carried by the cargo body 12. The elevating mechanism includes two mast assemblies 23, one being fixed to the truck at each side of the access opening 16. Each mast assembly 23 is fixed to a vertical rear edge 24 of the access opening 16 through use of an H-shaped frame 25 immobily secured to rear corner posts 26 of the cargo body 12. The H-shaped frame 25 includes crossbar 27 at floor 15 level of the truck, and upright pillars 28 which extend above as well as below the floor of the cargo body 12. Each mast assembly 23 is fixed to one of the H-shaped frame's pillars 28.

Figure 2:
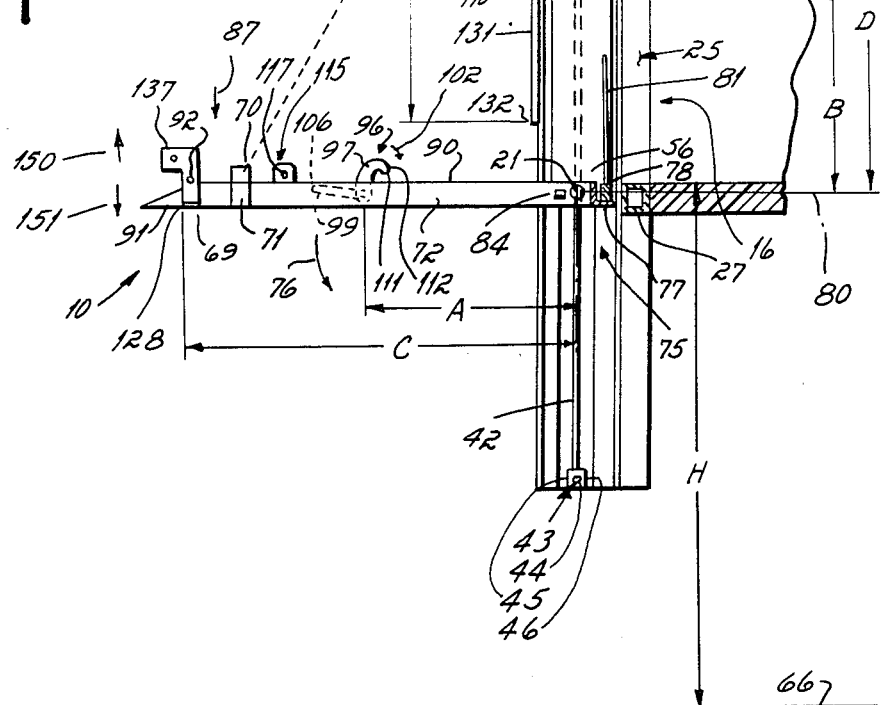
FIG. 2 is a side elevational view of the improved cargo elevator system shown in FIG. 1, the cargo platform being shown disposed at floor level of the cargo body.
Figure 8:
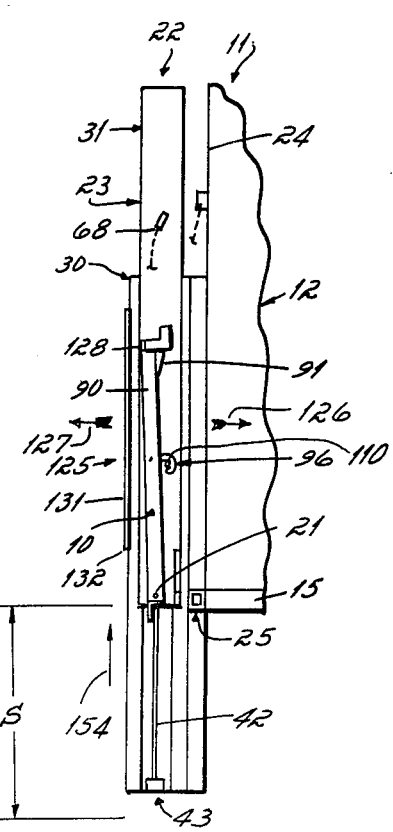
FIG. 8 is a view similar to FIGS. 2, 6 and 7 but showing the cargo platform in the final vertical storage position.

The cargo platform 10 is operable as an elevator through use of mast assemblies 23 when positioned as shown in FIG. 2 as explained in greater detail below. Also, the cargo platform 10 is storable in a vertically upright position whereby the truck 12 can be driven over-the-road as shown in FIG. 8. Further, the cargo platform 10 is pivotable on pivot axis 21 between the FIG. 8 storage position and the FIG. 2 elevator position through use of mast assemblies 23 as explained in greater detail below.

The Elevating Mechanism

Figures 3, 4, 5:
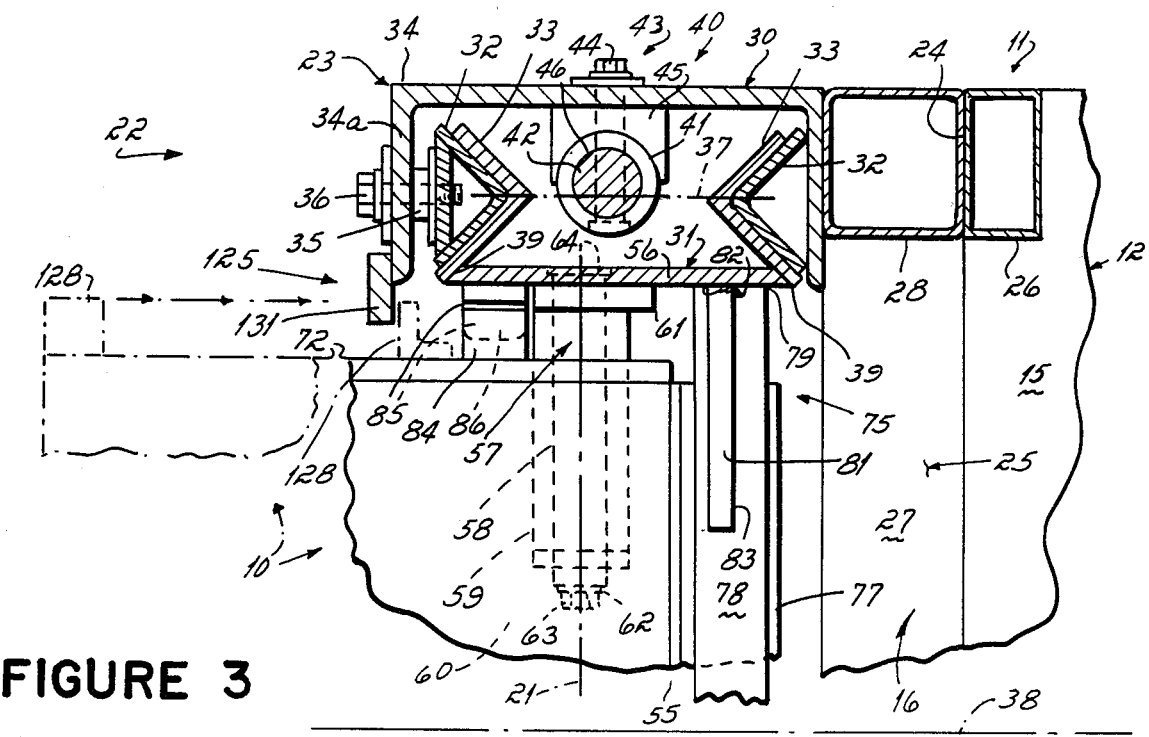
FIG. 3 is a broken away top view at one inner corner of the platform showing interconnection of the platform with the system's elevating mechanism.
FIG. 4 is a top view of one edge of the platform showing the latch mechanism by which the platform is held in and released from vertical storage position, as well as the fastener mechanism by which the platform's ramp is held in cart stop position.
FIG. 5 is a partially broken away side elevation view of the ramp and the fastener mechanism, the ramp being shown in ramp position in solid lines and in cart stop position in phantom lines.

Each mast assembly 23 includes a vertical C-shaped mast guide 30 immobily mounted to a pillar 28 of the H-shaped frame 25, see FIGS. 2 and 3. Each mast guide 30 is mounted so that its open side faces the other mast guide across the rear access opening 16 of the cargo body 12. A slide bar or mast 31 is received within each mast guide 30 for vertical sliding movement therein. Each mast 31 is guided in its vertical sliding movement by vertical V-shaped guides 32, 33 partially carried by the mast guide 30 and partially carried by the mast 31. The outer 32 and inner 33 V-shaped guides are oriented so that the phantom planes 37 which bisect each angle are coplanar one with the other, and are parallel to the longitudinal center plane 38 of the truck's cargo body 12. One of the outer V-shaped guides 32 is removably fixed to side flange 34a of the C-shaped channels 30 by spacers 35, bolt 36 and threaded holes (not shown). The outer V-shaped guides 32 cooperate with inner V-shaped guides 33 fixed to each mast 31. The inner V-shaped guides 33 are welded at one end 39 to opposite edges of the mast 31. The inner V-shaped guides 33 are fixed to the mast 31 so that same are disposed in overlying relation with the outer V-shaped guides 32 fixed to the mast guide 30, thereby permitting the sliding relationship between the mast and the mast guide without disassembly of one from the other in any lateral direction when the mast assembly 23 is vertically mounted at the rear corner of a truck's body 12. Thus, each mast 31 is guided in its vertical sliding movement by the inner V-shaped guides 33 fixed to mast 31 that cooperate with the outer V-shaped guides 32 fixed to mast guide 30.

Each mast 31 and mast guide 30 is also connected with mast lifting means 40 to selectively raise and lower the mast within its mast guide, see FIGS. 2 and 3. The mast lifting means 40 may be either mechanical, hydraulic or pneumatic means. In the embodiment shown, a linear fluid motor 41 is disposed within the interior of each of the mast assemblies. Each motor 41 includes a ram rod 42 which is coupled to the bottom end of mast guide 30 as at 43 by a connector bolt 44. The rod 42 is held in place at that end 43 by a block 45 with seat 46 that receives the ram rod end to which the rod is pinned. Each motor 41 also includes a drive cylinder 47 which is coupled as at 48 to the top end of mast 31 through a brace plate 49 and pin 50. Each fluid motor 41 is actuated by pressurized fluid supplied by fluid pump, not shown, mounted beneath the floor 15 of the cargo body 12 at a position centrally located of the truck. The fluid pump is connected with drive cylinders 47 by fluid piping, not shown, to establish a fluid circuit, not shown, between the pump and the motors 41. The fluid pump may be electrically controlled from equipment stored in a control box, not shown. The control box may store a flexible electrical conduit and controller, not shown, to permit the cargo platform's operator to stand away from the cargo body 12 to observe and control operation of the cargo platform 10. The control box and controller are more particularly shown in Himes U.S. Pat. No. 3,371,805, the disclosure of which is incorporated by reference herein.

The cargo platform 10 is pivotally mounted on a pivot axis 21 adjacent its front edge 55 near the bottom ends 56 of the masts 31, see FIGS. 1–3. The pivotal joint 57 is achieved, on each side of the platform, by means of a pin 58 fixed as at 64 to the mast 31 which is received in a collar 59 fixed to the underside 60 of the platform adjacent its front edge 55. A bearing plate 61 fixed to the mast 31 cooperates with a washer 62 and nut 63 at the free end of the pin 58 to permit pivotal motion of the collar 59 relative to the pin 58 and, thereby, pivotal motion of the platform 10 relative to the mast assemblies 23 and relative to ground 66.

The cargo platform 10 is maintained in a horizontal position by means of flexible tension means such as, e.g., chains 67, belts or wires, on each side of the platform when the platform is open in elevator position, see FIGS. 1 and 2. Each chain 67 is permanently fixed to a mast 31 of a mast assembly 23 at its inner end as at 68. And each chain 67 is permanently secured at its outer end to the cargo platform 10 adjacent its free or ramp edge as at 70, the chain being connected to plate 71 fixed to side edge 72 of the platform as shown in FIG. 5. Thus, the chains 67 are each permanently connected at one end to their respective slidable masts 31, and at the other end adjacent the free edge 69 of the cargo platform 10.

A first fail-safe structure 75 is partially carried by the two masts 31, and partially carried on the platform 10 adjacent the platform's front edge 55, for preventing the platform from swinging on its pivot axis 21 toward ground 66 beyond the horizontal elevator position shown in FIG. 2. In other words, this first fail-safe structure 75, which is particularly shown in FIGS. 2–4, prevents the platform's free edge 69 from swinging downwardly in the direction shown by phantom arrow 76 in FIG. 2 toward ground when and if the flexible elevator chains 67 (which hold the platform in the horizontal elevator position) break during use of the platform as an elevator.

A first portion of the first fail-safe structure 75 that is connected with the mast assemblies 23 includes a safety ledge 77 positioned parallel to the platform's pivot axis 21 and fixed immobily to the front edge 55 of the platform. This safety ledge 77 is in the form of a right angle member that extends across substantially the entire width W of the cargo platform from one side edge 72 to the other. The safety ledge 77 cooperates with a safety bar 78 fixed at opposed ends 79 to opposed masts 31 of the mast assemblies 23. This safety bar 78 is also positioned parallel to the pivot axis 21 of the cargo platform 10, and is positioned in substantially the same horizontal plane 80 relative to ground as that pivot axis. The safety bar 78 is structurally reinforced at opposed ends 79 where it is connected to the opposed masts 31 by gusset plates 81 welded to the masts as at 82 and welded to the safety bar as at 83. The safety bar 78 and the safety ledge 77 are mounted to the cargo platform 10 on that side of the platform's pivot axis 21 opposite to that side of the platform adapted to carry cargo when the platform is used in elevator fashion. Note particularly, as shown in FIG. 2, that when the cargo platform 10 is horizontally disposed, the platform's safety ledge 77 will be seated, or bear upwardly, against the masts' safety bar 78 if the elevator chains 67 break.

The second portion of the first fail-safe structure 75 includes a safety lug 84 that extends out from and is immobily fixed to each side edge 72 of the platform 10, the safety lug being mounted to the platform on the platform's side edge at a location diametrically opposite from the location of the safety ledge 77. The safety lug 84 is fixed to the platform on each side at a position which allows same to cooperate with a safety bracket 85 that defines seat 86 when the platform is in the horizontal position. The safety bracket 85 is immobily fixed to the mast of its associated mast assembly 23. Thus, and when the platform is horizontally disposed, and if the elevator chains 67 break when the platform is being used as an elevator, the second portion of the first fail-safe structure 75, i.e., the platform 10 mounted safety lugs 84 and the mast 31 mounted safety brackets 85 also will cooperate one with another to prevent the platform's free edge 69 from pivoting downwardly, as shown by phantom arrow 76, toward ground 66. In other words, the two portions 77, 78 and 84, 85 of the first fail-safe structure 75 cooperate to prevent the cargo platform from pivoting downwardly beyond the horizontal position shown in FIGS. 1 and 2 if the elevator chains 67 should break while the platform is being used as an elevator. This for the reason, of course, that gravitational forces shown by phantom arrow 87 continuously exerted on the platform 10 are prevented from pivoting the platform's free edge 69 in the phantom arrow direction 76 if the elevator chains break during use. This is important, of course, because the first fail-safe structure will tend to prevent substantial damage to any cargo being carried on the platform 10 if the elevator chains 67 break during raising or lowering of the platform with cargo thereon.

The Cargo Platform

The cargo platform 10 is basically comprised of a main platform section 90, and a ramp section 91 swingably mounted on pivot axis 92 at the free edge 69 of that main platform section, see FIGS. 1, 2, 4 and 5. The main platform section 90 includes a floor 93, and a series of tubular braces 94 that run beneath the floor parallel one to the other between the side edges 72 of the platform. A skirt 95 is provided on the side edges of the platform, and is attached to the tubular braces 94, thereby providing a main platform section with a depth D'.

A latch mechanism 96 for holding the platform 10 in vertical storage position (shown in FIG. 8) is partially mounted to the platform, and partially carried by a mast 31 of mast assembly 23. The latch mechanism includes a latch hook 97 mounted on axle 98 at one end, a handle 99 being mounted on the other end of the axle. The axle 98 is carried in sleeve 100 fixed to the underside 108 of the platform's floor 93, so that the latch hook 97 is swingable on axis 101 defined by the axle, which axis 101 is parallel to the platform's pivot axis 21. The axle 98 is of a length L that it extends out beyond the platform's side to position the hook 97 outboard of the platform's side edge 72. The latch hook 97 is continuously biased in a clockwise direction 102 as shown in the figures by coil spring 103 fixed at one end 104 to the axle 98 and at the other end 105 to the platform floor's underside as shown in FIG. 4. This spring motor 103 continuously biases the latch hook 97 to a ready position shown in FIG. 2 when the platform is in the elevator position, which ready position is established by the latch mechanism's handle 99 abutting the underside of the platform's floor 93 as at 106. Note particularly, as shown in FIG. 2, that the latch handle 99 and axle 98 are within the confines of the depth D defined by the platform's side skirts 95 so that the latch mechanism 96 does not extend beyond bottom edges 107 of the platform 10 when the platform is in the storage position shown in FIG. 8. Also, and importantly, note that the latch handle 99 is readily accessible to an operator from the underside 108 of the platform 10 so that when the platform is in the vertical storage position shown in FIG. 8 the latch hook 97 can be easily unlatched from latching relation with the mast 31 by an operator standing on the ground.

The latch hook 97 cooperates with a latch pin 110 fixed to its associated movable mast 31, see FIG. 2. Note that the distance A between the latch hook's pivot axis 101 and the platform's pivot 21 axis is substantially the same as the distance B between the latch pin 110 and the platform's pivot axis 21. Note also that the latch hook 97 presents a cam edge 111 on the nose portion 112 thereof. Accordingly, and as the platform 10 is swung from the horizontal elevator position toward the vertical storage position, the latch hook's cam edge 111 contacts the pin 110 to bias the latch hook 97 counterclockwise on its axis 101 against the force of coil spring 103 so that the latch hook can ride over and engage the latch pin fixed to the movable mast 31. This, of course, provides an automatic latching mechanism by which the cargo platform 10 is positioned and held in vertical storage relation with the movable mast 31.

Figure 6:
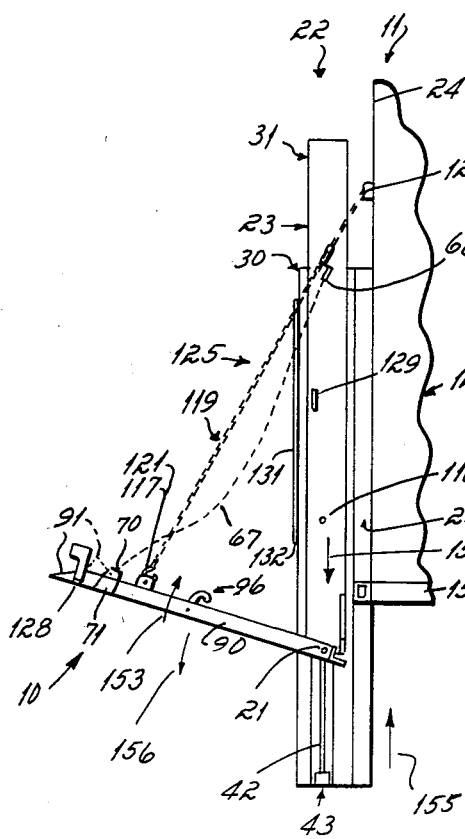
FIG. 6 is a side elevational view similar to FIG. 2 but illustrating one step of the storage operation sequence of the cargo platform as it is translated between the horizontal elevator position shown in FIG. 2 and the vertical storage position shown in FIG. 8.

The cargo platform 10 also includes a hook bracket 115 adjacent its free edge 69 thereof, see FIGS. 1 and 4–6. The hook bracket 115 is characterized by a C-shaped plate 116 immobily fixed to the platform's floor 93 with a bar 117 extending between upstanding ears 118 of that bracket. Each hook bracket 115 is adapted to cooperate with an open/close chain 119 fixed at one end 120 to the truck 12, the open/close chain having a hook 121 on the free end thereof. The open/close chain 119 is of a length sufficient to permit the chain's hook 121 to be connected with the bar 117 of the hook bracket 115 when the cargo platform is in the upper or floor level elevator position shown in FIG. 2. But the open/close chain's length is not substantially greater than that which will permit the hooked connection when the cargo platform is so upraised. Thus, when the open/close chain 119 is connected with the cargo platform's hook bracket 115 with the platform in the FIG. 2 position, and when the masts 31 are lowered by mast motors 41, i.e., when the platform's pivot axis 21 is forced down in the direction illustrated by phantom arrow 152 as shown in FIG. 6, the platform 10 is swung from the horizontal elevator position shown in FIG. 2 in the direction of phantom arrow 153 toward a vertical intermediate position shown in FIG. 7 since the open/close chain 19 is fixed at one end to the cargo body 12.

Figure 7:
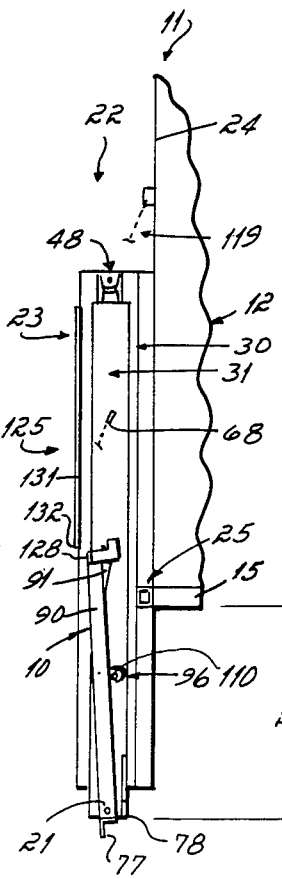
FIG. 7 is a view similar to FIGS. 2 and 6 but showing the cargo platform at an intermediate position as it is translated between the horizontal elevator position and the vertical storage position.

The cargo elevator system also includes a second fail-safe structure 125 that is partially mounted to the cargo platform 10, and partially mounted to the mast assemblies 23, that prevents the platform from swinging out of its vertically upright storage position (either forward as shown by phantom arrow 126 or rearward as shown by phantom arrow 127) when the platform is in its final over-the-road vertical storage position as shown in FIG. 8. This structure is shown in detail in FIGS. 2–4, and basically is comprised of three components. The first component is in the nature of a locator lug 128 immobily fixed to the cargo platform 10 at the free edge 69 at each front corner thereof as shown in FIG. 4. This locator lug 128 extends outwardly beyond the side edge 72 of the cargo platform 10. The second component is mounted on the mast 31 of each mast assembly 23, and is in the form of a stop tongue 129 that extends outwardly from that mast toward the platform 10. Note the distance C from the platform's pivot axis 21 to the center line 92 of the platform's locator lug 128 is substantially the same as the distance D from the platform's pivot axis 21 to the center line 130 of the mast's stop tongue 129. This equidistant relationship C, D never changes because both the platform's locator lug 128 and the mast's stop tongue 129 are connected one with the other at all times through the platform's pivot axis 21. Therefore, and at any position of the platform relative to ground, the distances C, D are the same. This is an important feature of this invention as to the second fail-safe structure 125 aspect of the cargo elevator system because when the cargo platform 10 is raised from the horizontal position shown in FIG. 2 toward the vertical position shown in FIGS. 7 and 8, the platform's locator lugs 128 contacts the masts' stop tongues 129 to positively locate the platform in the vertically upright position, and to prevent further swinging motion of the platform in the direction shown by phantom arrow 126. The third portion of the second fail-safe structure 125 is in the form of a vertical stop track 131 fixed to the outer flange 34a of the mast guide 30 of each mast assembly 23. The stop track 131, which is particularly illustrated in FIGS. 2 and 3, is mounted to the mast guide 30 as shown in FIG. 3 so as to overlie the platform's locator lug 128 when the platform 10 is in vertical position. Also, and as shown in FIGS. 2 and 7, the bottom edge 132 of the stop track 131 is positioned so that the platform's locator lug 128 can swing underneath same when the platform 10 is moved between the horizontal elevator (FIG. 2) and intermediate storage (FIG. 7) positions, yet will immediately move upwardly behind the stop track as the vertically positioned platform is moved upwardly from the FIG. 7 position toward the over-the-road (FIG. 8) position, or downwardly from the FIG. 8 position to the FIG. 7 position, continuously throughout the motion path of the platform's locator lug during that motion. In this regard, the length L' of the stop track is preferably at least as long as the stroke length S required to move the platform 10 between the intermediate FIG. 7 position where the locator lug 128 can swing underneath the stop track's bottom edge 132 and the final over-the-road vertical storage FIG. 8 position. Therefore, the masts' stop tongues 129 prevent the platform from inward swinging motion in the direction of phantom arrow 126 as the vertically oriented platform is moved between the FIG. 7 and FIG. 8 positions, as well as when it is in the final over-the-road FIG. 8 storage position, and the stop tracks 131 prevent the platform from swinging outward in the direction of phantom arrow 127 as the vertically oriented platform is moved between FIG. 7 and FIG. 8 positions, as well as when it is in the final vertical storage over-the-road position.

The cargo platform 10, at its free edge 69, includes a ramp 91 as previously mentioned, see FIGS. 1, 4 and 5. The ramp 91 is for the purpose of permitting wheeled carts, not shown, to move easily between ground 66 level and the platform's form's floor 93. The ramp 91 is provided with an upstanding ear 135 at each end 136 thereof, the ramp ear cooperating with an inverted and rearwardly facing dog leg latch plate 137 fixed to the platform's main section 90 at each rear corner thereof. The ramp's ears 135 and the main section's latch plated 137 are pinned together so as to define a pivot axis 92 for the ramp. Note that the ramp's pivot axis 92 is positioned a distance E somewhat above the top surface 138 of the main section's floor 90 when the platform is horizontal as shown in FIG. 5. When the cargo platform 10 is to be stored, the ramp 91 can be pivoted thereover into the phantom line position shown in FIG. 6, thereby causing the ramp's 91 free edge 139 to remain flush against the platform floor's top surface 138 as the platform is translated between the vertical storage and horizontal elevator positions because of the ramp's elevated pivot axis 92 position.

The ramp 91 is reinforced throughout its length by an angle plate 140 which provides, at each end of the ramp, a mounting seat for sleeve 141 that receives a ramp latch pin 142. The latch pin 142 is simply reciprocable within that sleeve 141, and is provided with a handle 143 at its inner end. Each latch pin 142 is adapted to cooperate with bore 144 in a latch plate 137 when the ramp 91 is swung in the direction shown by phantom arrow 145 in FIG. 5 between load/unload position shown in solid lines and cart stop position shown in phantom lines. In other words, and when the ramp 91 has been swung into the cart stop position shown in phantom lines in FIG. 5, the ramp latch pins 142 carried by the ramp on the under surface 146 thereof are simply inserted through bores 144 in the latch plates 137 to hold the ramp in the vertically upright position. In this regard, note that the distance F between the top surface 138 of the platform's main section 90 and the latch bore 144 in the latch plate 137 is significantly higher above the platform's floor than is the distance E of the ramp's pivot axis above the floor. When in the phantom line vertical stop position shown in FIG. 5, any wheeled carts, not shown, carried on the cargo platform 10 will be prevented from rolling off the free edge 69 of the platform as it is used in elevator fashion.

Operation of the Cargo Elevator System

In operation of the system of this invention, the elevator position of the cargo platform 10 is illustrated in FIGS. 1–5. In this elevator use position, and particularly as shown in FIG. 2, the cargo platform 10 is maintained in horizontal position relative to ground by elevator chains 67 fixed at one end 68 to their respective moveable masts 31 and at the other end 70 to the platform adjacent the platform's free edge 69. Also, the platform's ramp 91 is positioned as shown in FIG. 5 relative to its pivot axis, the support rails 140 for the ramp bearing against the front cross member 94a of the platform's main section in response to gravitational forces 87 to maintain the ramp's top surface 147 in its angled position relative to the top surface 138 of the platform's main section 90. In this regard, note the pivot point of the ramp is offset a distance G away from the free edge 69 of the platform's main section 90 so as to constantly insure a gravitationally induced pivot force shown by phantom arrow 148 on the ramp which, in turn, insures that the ramp maintains the FIG. 5 position when that position is desired by the platform's operator.

It is further important, in connection with certain aspects of this invention, to point out the two basic portions of the first fail-safe structure 75, and that same stand ready to be operative when and if the elevator chains break during use of the cargo platform. In this respect, and as shown in FIGS. 2 and 3, the first portion of that first fail-safe structure includes the safety ledge 77 that extends along and is mounted to the inner edge 55 of the cargo platform 10 which is specially positioned to cooperate with safety bar 78 that extends between and is mounted to opposed masts 31. And the second portion of the first fail-safe structure 75 includes safety lugs 84 that extend outwardly beyond and are fixed to respective side edges 72 of the cargo platform 10 that are adapted to engage safety brackets 85 fixed to the respective masts 31. The fact that these two portions 77, 78 and 84, 85 of the first fail-safe structure 75 are disposed on diametrically opposite sides of the cargo platform's pivot axis 21 allows same to cooperate effectively in preventing the platform's ramp edge 69 from pivoting downward toward ground (in the direction of arrow 76) beyond the horizontal use position when and if the elevator chains 67 break. In other words, and if the elevator chains 67 should break during use of the cargo platform 10 as an elevator, the safety bar 78/safety ledge 77, and the safety lug 84/safety bracket 85 would engage immediately one with another to prevent the cargo platform from dropping out of the FIG. 2 horizontal elevator position toward ground on its pivot axis 21. This objective is accomplished, of course, because safety bar 78 component and safety bracket 85 component of the first fail-safe structure 75 are immobily fixed to the masts 31 adjacent the pivot connection 57 of the cargo platform 10 with those masts.

The cargo platform 10 is raised and lowered as shown by phantom arrows 150, 151, respectively, during use of the platform as an elevator, as selected by the platform's operator, by motors 41 that are within the opposed mast assemblies 23. In this regard, and as previously noted, the piston rod 42 of each motor 41 is immobily fixed at its free end 43 to the bottom of its associated mast guide 30; this, in effect, fixes that end of the motor 40 relative to the cargo body 12 since the mast guide is immobily fixed thereto through H-shaped mounting frame 25. The cylinder 47 of each motor 41 is fixed at its free end 48 to the top of its associated mast 31. Accordingly, and as the fluid motors 41 are operated by the platform's operator through use of the hydraulic power pack and control system (not shown, but known to the art), the masts 31 are selectively moved up or down within the mast guides 30 as is desired by the operator. The masts 31 are guided in that up and down movement by outer V-shaped guides 32 fixed to the mast guides 30, and inner V-shaped guides 31 fixed to the masts 31, as shown in FIG. 2.

When the cargo platform is being operated as an elevator, and if one or more carts (not shown) are positioned on the platform, it is desirable to make use of the platform's ramp 91 as a cart stop. As shown in FIGS. 4 and 5, the ramp 91 can be swung up about its pivot axis 92 so as to position the ramp plate's top surface 147 in a generally vertical position relative to ground when the platform 10 is horizontally disposed. And the ramp plate 147 is held in this vertical position by ramp latch pins 142 that are pushed through bores 144 in their respective latch plates 137. This simple latch structure latches the ramp 91 in an upright position, and in this position no wheeled carts can roll over the free edge 69 of the cargo platform's main section 90. The fact that the latch bores 144 are located substantially above the ramp's pivot axis 92 insures a positive latch for the ramp 91 in the chock position. And the fact that the ramp plate's pivot axis 92 is positioned above the top surface 138 of the platform's main section 90 permits the ramp's free edge 139 to be located in its chock position a distance J above that top floor surface which is greater than the length K of the ramp itself, thereby enhancing the chocking function of the ramp plate's top surface 147 when it is in the chock position. Further, and when it is desired to store the cargo platform 10 in its vertical storage position as discussed in detail below, the ramp 91 is folded over on its pivot axis 92 until the ramp edge 139 is in contact with the cargo platform's top surface 138 as shown in phantom lines in FIG. 6. The fact that the ramp's pivot axis 92 is located a distance E above the main section's floor surface 138 tends to insure that the ramp 91 will maintain that folded over position as the platform 10 is translated between vertical and horizontal positions.

The operation step sequence by which the platform 10 is translated from the horizontal elevator use position to the vertical over-the-road storage position is illustrated in FIGS. 2 and 6-8. Initially, and when it is desired to move the cargo platform 10 from the horizontal elevator position to the vertical storage position, the platform is first raised until the platform is even with the truck's floor 15 as shown in FIG. 2. In that FIG. 2 position, the open/close chains 119, which are immobily connected at one end 120 to the truck, are then connected at the other end at bracket 115 to the platform through use of hooks 121 on the free end of the chains. The ramp 91 is then pivoted from the ramp position shown in solid lines in FIG. 5, or from the chock position shown in phantom lines in FIG. 5, into the storage position where the ramp's surface 147 overlies the floor 138 of the platform's main section 90, as shown in phantom in FIG. 6 and solid in FIGS. 7 and 8. Thereafter, and as is shown particularly in FIG. 6, the masts 31 are then lowered within the mast guides 30 in the direction shown by phantom arrow 152 through use of the mast assemblies' motors 41. Since the platform 10 is now fixed to the truck 12 adjacent its free edge 69 by the open/close chains 119, the platform is caused to pivot in the direction shown by phantom arrow 153 in FIG. 6 on its pivot axis 21 from the horizontal FIG. 2 position toward its vertical storage position.

The platform's pivot axis 21 is continuously lowered by the mast assemblies' motors 41 until the platform is substantially vertically oriented in an intermediate close position as shown in FIG. 7. As the platform 10 achieves the vertical orientation position shown in FIG. 7, the latch hook 97 interengages the latch pin 110 immobily mounted on its respective masts 31. And since the distance between the latch hook 97 on the platform 10 and the respective latch pin 110 on mast 31 is substantially the same relative to the pivot axis 21 of the platform, same are interengaged as the platform achieves the vertically upright position. This interengagement occurs automatically in light of the latch mechanism 96 structure in that cam edge 111 of the latch hook 97 rides up over the latch pin 110 as permitted by the torsion spring 103 so as to latch the latch hook's nose 112 around that latch pin. Of course, when the latch hook's nose 112 passes over the latch pin 110 then the torsion spring 103, which continuously biases the latch hook in a clockwise direction as shown in the figures, insures that the latch hook 97 is properly seated over the latch pin. The latch hook 97 is always held at the ready position by virtue of the latch hook's handle 99 bearing against the under surface 108 of the platform's floor 93 as shown at 106 in FIG. 2. Thus, the latch hook 97 needs never be re-set in order to make it ready for interengagement with the latch pin 110 as the cargo platform 10 is swung to the vertical position from the horizontal position. This is important in that it allows the latch mechanism 96 to operate automatically without need for attention being paid to it by the cargo platform's operator. With the latch hook 97 interengaged with the latch pin 110, thereby restraining the cargo platform in substantially vertical position, an intermediate position in the closing sequence is established as shown in FIG. 7.

After the intermediate FIG. 7 position has been established, the cargo platform's operator then raises the masts 31 within the mast guides 30 by means of the motors 41 in the direction shown by phantom arrow 154 in FIG. 8 until the platform's pivot axis 21 is adjacent the truck's floor 15. This raising step locates the cargo platform 10 in the final vertical storage position for over-the-road transport as shown in FIG. 8.

In the final over-the-road storage position, it is important to note that a second fail-safe structure 125 is operative for preventing the platform from swinging out of that vertical storage position in either direction 126 or 127. And indeed, this second fail-safe structure 125 is operative not only while the platform is in the final vertical over-the-road storage position shown in FIG. 8, but is operative also while the substantially vertical platform is being raised by the mast assemblies 23 to the final FIG. 8 position from the intermediate FIG. 7 position. In this regard, the locator lugs 128 immobily fixed to the outer free edge corners of the platform's main section 90, and which extend significantly beyond the side edges 72 of that main section, cooperate with the safety tongues 129 fixed to the masts 31 and the safety tracks 131 fixed to the mast guides of the mast assemblies 23. In this regard, and as is shown in FIGS. 3 and 8, each of the cargo platform's locator lugs 128 is trapped between a safety tongue 129 fixed to a mast 31 and a safety track 131 fixed to a mast guide 30 when the platform 10 is in the vertical over-the-road FIG. 8 storage position, thereby preventing the cargo platform from falling or swinging in either direction shown by phantom arrows 126 and 127 even if the automatic latch mechanisms 96 should fail. Only a safety tongue 129 is required to prevent interior pivot motion shown in the direction of phantom arrow 126 since the mast's safety tongue and the platform's locator lug 128 are both located a distance C and D substantially identical one to the other relative to the platform's pivot axis 21. Also in this regard, the safety track 131 is a relatively long vertical track disposed parallel to the up 155/down 152 travel path of the masts 31 within the mast guides 30. The safety track 131 terminates at a bottom edge 132 which is just above the locator lug 128 when the platform 10 is in the intermediate FIG. 7 position. Hence, the locator lugs 128 and tracks 131 cooperate to insure that the platform 10 is prevented from falling outwardly in the phantom arrow direction 126 as it is moved up 154 or down 152 between the FIG. 7 and FIG. 8 positions even if the latch mechanisms 96 have for some reason failed. In other words, and during the raising or lowering of the platform 10 in the vertical attitude, the extended length tracks 131 cooperate to prevent the platform 10 from falling outwardly in the direction of phantom arrow 127 unless and until the open/close chains 119 connected to the platform are substantially taut as shown in FIG. 6. At the FIG. 6 chain 119 taut position, of course, it is then possible to permit the cargo platform 10 to swing down on its pivot axis. The tracks 131 also cooperate with locator lugs 128 to hold the platform 10 in the over-the-road storage position of FIG. 8 even if the latch mechanisms 96 break as the truck 12 travels over-the-road.

The opening of the cargo platform 10 involves a sequence of steps that are reversed relative to the closing sequence of steps just described. However, and in addition, the latch mechanism 96 must be manually disengaged by the cargo platform's operator in the platform 10 opening sequence after the platform has been moved from the vertical over-the-road storage position shown in FIG. 8 to the intermediate open/close position shown in FIG. 7. After having moved the platform 10 to the FIG. 7 position, the operator need merely grip the latch hook's handle 96 (which is positioned for easy access when the platform is upright on the underside 108 of the platform). The open/close chains 119 remain connected at all times at both ends between truck 12 and the platform 10, so the platform cannot fall or pivot outwardly in the direction shown by phantom arrow 127 so as to harm the operator when in the FIG. 7 position. The operator thereafter simply raises the masts 31 within the mast guides 30 in the direction shown by phantom arrow 155 after the platform 10 has been swung outwardly so that the locator lugs 128 have been moved out from behind the safety tracks 131, see FIG. 6. This causes the cargo platform 10 to swing in the direction of phantom arrow 156 and, thereby, to return to the horizontal elevator position. When the platform 10 again reaches the FIG. 2 elevator position, the open/close chains 119 are then disconnected from the platform so that it can again be used as an elevator.

Having described in detail the preferred embodiment of my invention, what I desire to claim and protect by Letters Patent is:

1. A cargo elevator system comprising
   a cargo platform adapted to swing between a vertically upright storage position and a horizontal elevator position,
   a mast assembly having a mast and a mast guide, said mast guide being fixed relative to ground and said mast being movable within said mast guide during use of said system, said cargo platform being pivotally connected on a pivot axis to said mast, said platform's pivot axis having an overall stroke length that permits said platform to move between uppermost and lowermost elevator use positions,
   a flexible tension member connecting the free edge of said platform with said mast, said flexible tension member permitting said platform to swing between said vertically upright storage position and said generally horizontal elevator use position,
   a first safety element on said cargo platform adjacent a front corner of said platform,
   a second safety element on said mast, said second safety element being positioned on said mast a distance from the pivot axis of said cargo platform which is substantially equal to the distance of said first safety element from the pivot axis of said platform, said first and second safety elements abutting against one another when said platform is swung from horizontal to vertical prior to said platform being finally stored,
   a third safety element on said mast guide, said third safety element being of a length substantially the same as but slightly shorter than the stroke length of said platform's pivot axis, said first safety element being captured between said second safety element and said third safety element when said platform is moved between a vertically upright intermediate position adjacent the base of said pivot axis' travel path and a final vertically upright storage position above ground level for insuring that said cargo platform does not inadvertently swing away from its vertical position while being moved between said intermediate position and finally stored position, said first and second safety elements cooperating to prevent said platform from being swung beyond said vertically upright position at all times when said platform is positioned at any location where said first safety element does not contact said third safety element as said platform is swung between said upright and horizontal positions,
   a latch hook connected to said platform, and a latch pin connected to said mast, said latch hook and said latch pin engaging one with the other in latched relation as said platform is moved from a horizontal position into a vertical position, thereby restraining said platform in a vertical latched position with said mast,
   manual handle structure connected to said latch hook, said handle structure being positioned on the underside of said platform, said handle structure being easily usable by an operator standing adjacent the underside of said vertically oriented platform when said platform is latched with said mast, said handle structure abutting the underside of said platform to establish a latch hook ready position for interengagement of said latch hook with said latch pin when said latch hook and latch pin are not connected in latched relation,
   a spring continuously biasing said latch hook to said ready position, said spring permitting said latch hook to latchingly engage said latch pin as said platform achieves said vertical position, said spring also functioning to retain said latch hook in latched relation with said latch pin, and
   two horizontal safety elements mounted on said mast and two horizontal safety elements mounted on said platform, said platform mounted elements being disposed in generally diametrically opposite locations relative to the pivot axis of said platform, and said mast mounted elements cooperating to define a support plane generally parallel to ground during use of said system, said horizontal safety elements cooperating one with another to prevent said platform from swinging downwardly beyond said horizontal elevator position.

2. A cargo elevator system comprising a cargo platform adapted to swing between a vertically upright storage position and a horizontal elevator position, a mast assembly having a mast and a mast guide, said mast guide being fixed relative to ground and said mast being movable within said mast guide during use of said system, said cargo platform being pivotally connected on a pivot axis to said mast, said platform's pivot axis having an overall stroke length that permits said platform to move between uppermost and lowermost elevator use positions, a first safety element on said cargo platform adjacent a front corner of said platform, a second safety element on said mast, said second safety element being positioned on said mast a distance from the pivot axis of said cargo platform which is substantially equal to the distance of said first safety element from the pivot axis of said platform, said first and second safety elements abutting against one another when said platform is swung from horizontal to vertical prior to said platform being finally stored, a third safety element on said mast guide, said third safety element being of a length substantially the same as but slightly shorter than the stroke length of said platform's pivot axis, said first safety element being captured between said second safety element and said third safety element when said platform is moved between a vertically upright intermediate position adjacent the base of said pivot axis' travel path and a final vertically upright storage position above ground level for insuring that said cargo platform does not inadvertently swing away from its vertical position while being moved between said intermediate position and finally stored position, said first and second safety elements cooperating to prevent said platform from being swung beyond said vertically upright position at all times when said platform is positioned at any location where said safety element does not contact said third safety element as said platform is swung between said upright and horizontal positions, a latch hook connected to said platform, and a latch pin connected to said mast, said latch hook and said latch pin engaging one with the other in latched relation as said platform is moved from a horizontal position into a vertical position, thereby restraining said platform in a vertical latched position with said mast, manual handle structure connected to said latch hook, said handle structure being positioned on the underside of said platform, said handle structure being easily usable by an operator standing adjacent the underside of said vertically oriented platform when said platform is latched with said mast, said handle structure abutting the underside of said platform to establish a latch hook ready position for interengagement of said latch hook with said latch pin when said latch hook and latch pin are not connected in latched relation, and a spring continuously biasing said latch hook to said ready position, said spring permitting said latch hook to latchingly engage said latch pin as said platform achieves said vertical position, said spring also functioning to retain said latch hook in latched relation with said latch pin.

3. A cargo elevator system as set forth in claim 2, said first element being in the form of a locator lug, said second element being in the form of a stop tongue, and said third element being in the form of a stop track.

4. A cargo elevator system as set forth in claim 2 comprising a flexible tension member connecting the free edge of said platform with said mast, said flexible tension member permitting said platform to swing between said vertically upright storage position and said generally horizontal elevator use position, and two horizontal safety elements mounted on said mast and two horizontal safety elements mounted on said platform, said platform mounted elements being disposed in generally diametrically opposite locations relative to the pivot axis of said platform, and said mast mounted elements cooperating to define a support plane generally parallel to ground during use of said system, said horizontal safety elements cooperating one with another to prevent said platform from swinging downwardly beyond said horizontal elevator position.

5. A cargo elevator system as set forth in claim 3, one horizontal safety element mounted on said platform comprising a safety ledge mounted to the pivot edge of said platform, one horizontal safety element mounted on said mast comprising a safety bar connected at one end to said mast and extending parallel to said platform's pivot axis for interengagement with said ledge, one horizontal safety element mounted on said platform comprising a safety lug mounted on a side edge of said platform, and one horizontal safety element mounted on said mast comprising a safety tongue extending toward said platform for interengagement with said lug.

6. A cargo elevator system comprising a cargo platform swingable on a pivot axis between a generally horizontal elevator position and a generally vertical storage position, a mast assembly having a mast guide and a mast movable relative thereto, said mast guide being immobile relative to ground during use of said system, and said platform being pivotally connected at one edge thereof to said mast, a flexible tension member connecting the free edge of said platform with said mast, said flexible tension member permitting said platform to swing between said vertically upright storage position and said generally horizontal elevator use position, and two horizontal safety elements mounted on said mast and two horizontal safety elements mounted on said platform, said platform mounted elements being disposed in generally diametrically opposite locations relative to the pivot axis of said platform, and said mast mounted elements cooperating to define a support plane generally parallel to ground during use of said system, said horizontal safety elements cooperating one with another to prevent said platform from swinging downwardly beyond said horizontal elevator position.

7. A cargo elevator system as set forth in claim 6, one horizontal safety element mounted on said platform comprising a safety ledge mounted to the pivot edge of said platform, and one horizontal safety element mounted on said mast comprising a safety bar connected at one end to said mast and extending parallel to said platform's pivot axis for interengagement with said ledge.

8. A cargo elevator system as set forth in claim 7, one horizontal safety element mounted on said platform comprising a safety lug mounted on a side edge of said platform, and one horizontal safety element mounted on said mast comprising a safety tongue extending toward said platform for interengagement with said lug.

9. A cargo elevator system comprising a cargo platform adapted to swing between a vertically upright storage position and a horizontal elevator position, a mast assembly having a mast and a mast guide, said mast guide being fixed relative to ground and said mast being movable within said mast guide during use of said system, said cargo platform being pivotally connected on a pivot axis to said mast, said platform's pivot axis having an overall stroke length that permits said platform to move between uppermost and lowermost elevator use positions, a first safety element on said cargo platform adjacent a front corner of said platform, a second safety element on said mast, said second safety element being positioned on said mast a distance from the pivot axis of said cargo platform which is substantially equal to the distance of said first safety element from the pivot axis of said platform, said first and second safety elements abutting against one another when said platform is swung from horizontal to vertical prior to said platform being finally stored, and a third safety element on said mast guide, said third safety element being of a length substantially the same as but slightly shorter than the stroke length of said platform's pivot axis, said first safety element being captured between said second safety element and said third safety element when said platform is moved between a vertically upright intermediate position adjacent the base of said pivot axis' travel path and a final vertically upright storage position above ground level for insuring that said cargo platform does not inadvertently swing away from its vertical position while being moved between said intermediate position and finally stored position, said first and second safety elements cooperating to prevent said platform from being swung beyond said vertically upright position at all times when said platform is positioned at any location where said first safety element does not contact said third safety element as said platform is swung between said upright and horizontal positions.

10. A cargo elevator system as set forth in claim 9, said first element being in the form of a locator lug, said second element being in the form of a stop tongue, and said third element being in the form of a stop track.

* * * * *